US008675504B2

(12) United States Patent
Langner et al.

(10) Patent No.: US 8,675,504 B2
(45) Date of Patent: Mar. 18, 2014

(54) ENERGY EFFICIENT ETHERNET (EEE) WITH 10GBASE-T STRUCTURES

(75) Inventors: Paul Langner, Fremont, CA (US); Hossein Sederat, San Jose, CA (US)

(73) Assignee: Aquantia Corporation, Milpitas, CA (US)

( * ) Notice: Subject to any disclaimer, the term of this patent is extended or adjusted under 35 U.S.C. 154(b) by 27 days.

(21) Appl. No.: 13/168,251

(22) Filed: Jun. 24, 2011

(65) Prior Publication Data

US 2011/0249686 A1 Oct. 13, 2011

Related U.S. Application Data

(63) Continuation of application No. 12/118,664, filed on May 9, 2008, which is a continuation of application No. 12/047,319, filed on Mar. 12, 2008, now abandoned.

(60) Provisional application No. 60/894,447, filed on Mar. 12, 2007.

(51) Int. Cl.
  *G01R 31/08* (2006.01)
  *H04J 1/16* (2006.01)
  *H04B 3/32* (2006.01)
  *H04J 1/12* (2006.01)

(52) U.S. Cl.
  CPC .... *H04B 3/32* (2013.01); *H04J 1/12* (2013.01)
  USPC .......................................................... 370/248

(58) Field of Classification Search
  CPC .......................................................... H04B 3/32
  USPC .......................................................... 370/248
  See application file for complete search history.

(56) References Cited

U.S. PATENT DOCUMENTS

| 5,680,400 | A | | 10/1997 | York | |
|---|---|---|---|---|---|
| 6,052,385 | A | * | 4/2000 | Kanerva et al. | 370/468 |
| 6,081,523 | A | | 6/2000 | Merchant et al. | |
| 6,111,890 | A | | 8/2000 | Rao | |
| 6,195,360 | B1 | | 2/2001 | Raza et al. | |
| 7,027,407 | B2 | | 4/2006 | Diepstraten et al. | |
| 7,324,511 | B2 | | 1/2008 | Nishihara | |
| 7,525,992 | B1 | * | 4/2009 | Shachal | 370/473 |
| 7,567,620 | B2 | | 7/2009 | Rozental | |
| 7,593,431 | B1 | | 9/2009 | Lo et al. | |
| 7,720,075 | B2 | * | 5/2010 | Costo | 370/395.53 |
| 7,738,482 | B2 | * | 6/2010 | Thousand et al. | 370/450 |

(Continued)

OTHER PUBLICATIONS

U.S. Appl. No. 12/604,358, filed Oct. 23, 2009, Sedarat et al.

(Continued)

*Primary Examiner* — Mark Rinehart
*Assistant Examiner* — Maharishi Khirodhar
(74) *Attorney, Agent, or Firm* — Mahamedi Paradice Kreisman LLP (57) ABSTRACT

An ethernet transceiver integrated circuit chip is disclosed including a plurality of transceivers for coupling to a corresponding plurality of physical channels. A channel switcher is coupled to the plurality of transceivers. During a first mode of operation, the channel switcher activates all of the plurality of transceivers to transceive data in accordance with a first aggregate data transfer rate. During a second mode of operation, the channel switcher activates less than all of the plurality of transceivers to transceive data in accordance with a second aggregate data rate that is less than the first aggregate data transfer rate.

10 Claims, 4 Drawing Sheets

(56) References Cited

U.S. PATENT DOCUMENTS

| | | |
|---|---|---|
| 2002/0006167 A1* | 1/2002 | McFarland .................... 375/260 |
| 2002/0119783 A1 | 8/2002 | Bourlas et al. |
| 2003/0040298 A1 | 2/2003 | Heatley |
| 2004/0184810 A1* | 9/2004 | Spilman et al. ............... 398/139 |
| 2005/0030808 A1* | 2/2005 | Brown et al. .................. 365/222 |
| 2005/0058152 A1 | 3/2005 | Oksanen et al. |
| 2005/0105545 A1 | 5/2005 | Thousand et al. |
| 2005/0152466 A1 | 7/2005 | Maltsev et al. |
| 2005/0259685 A1 | 11/2005 | Chang et al. |
| 2007/0192505 A1 | 8/2007 | Dalmia |
| 2007/0237270 A1* | 10/2007 | Mezer et al. .................. 375/346 |
| 2007/0248024 A1* | 10/2007 | Conway et al. ............... 370/252 |
| 2008/0187028 A1* | 8/2008 | Lida ............................... 375/140 |
| 2008/0294919 A1 | 11/2008 | Lida et al. |
| 2010/0075704 A1 | 3/2010 | McHenry et al. |
| 2010/0188980 A1 | 7/2010 | Desai et al. |

OTHER PUBLICATIONS

Ken Christense et al., IEEE 802.3az The Road to Energy Efficient Ethernet, IEEE Communications Magazine, Nov. 2010, 7 Pages.

Hugh Barrass, EEE Exchange of Management Information, IEEE 802.3az EEE Task Force, Mar. 2009, Vancouver, British Columbia, 11 Pages.

* cited by examiner

ENERGY EFFICIENT ETHERNET (EEE) WITH 10GBASE-T STRUCTURES

CROSS-REFERENCE TO RELATED APPLICATION

This application is a continuation of U.S. patent application Ser. No. 12/118,664, entitled "ENERGY EFFICIENT ETHERNET (EEE) WITH 10GBASE-T STRUCTURES", filed May 9, 2008 which is a continuation and claims benefit of priority to U.S. patent application Ser. No. 12/047,319, filed Mar. 12, 2008, now abandoned entitled "ENERGY EFFICIENT ETHERNET (EEE) WITH 10GBASE-T STRUCTURES", which claims the benefit of priority to U.S. Provisional Patent Application No. 60/894,447, filed Mar. 12, 2007, the contents of each being herein incorporated by reference.

BACKGROUND OF THE INVENTION

1. Field of the Invention

The present invention relates generally to digital communications, and more particularly, to switching to a lower data rate for power savings.

2. Description of Related Art

A communication system permits communication between two or more network devices. Communication between network devices can be conventionally achieved using a communication line (or link), formed by twisted pairs of wires (or cables), and transceivers, one transceiver positioned at each end of a twisted pair. For example, the IEEE 802.3 (10GBASE-T) standard targets data transmission rates with a total throughput of 10 Gbps over (4) pairs of twisted wires for distances of up to 100 m. The data transmission is generally performed in a simultaneous bidirectional fashion, thus each pair of wires simultaneously carries bidirectional data, each direction running effectively at 2.5 Gbps.

A common problem associated with a communication system using multiple twisted pairs of wires and multiple transceivers is noise in the form of interference signals. For example, due to the bidirectional nature of data transmission along a twisted pair (or channel), echo cancellation is typically performed which subtracts a transmitted signal from a received signal. Furthermore, since channel insertion loss is quite significant, the signal strength at the end of a communication line is typically very weak, and any noise and/or interference can significantly affect communication system bit error rate (BER). Thus, much effort is usually carried out to cancel any deterministic source of noise in a communication system.

Such deterministic noise sources include, for example, first reflection of a transmitted signal off of discontinuities in the communication line (so called echo), second intersymbol interference due to signal distortion in the communication line, and near-end crosstalk (NEXT) from channels adjacent to a given channel within a communication line, and differential signal wander caused by the AC coupled link and non-DC balanced data stream. Far-end crosstalk (FEXT) is another deterministic source of noise. Due to the high complexity of cancellation circuitry and the fact that far-end crosstalk is orders of magnitude weaker than other deterministic sources of noise, far-end crosstalk may not be typically cancelled. However, in the 10GBASE-T standard the very low system signal-to-noise ratio (SNR) requires FEXT cancellation as well. In the 10GBASE-T standard jitter and other alienated sources of interference are treated as random noise that are accounted for in the signal-to-noise (SNR) budget of the link.

After the cancellation of the major sources of deterministic noise, there is generally still not enough signal-to-noise ratio left to achieve a target bit error rate of 10E-12 for the link. Therefore, a low density parity check (LDPC) decoder typically follows the recovered data to provide coding gain and increase the effective signal-to-noise ratio. The overhead of the LDPC decoding is approximately $\frac{1}{7}$th of total data throughput.

SUMMARY OF THE INVENTION

A communications system and method for switching data rates while maintaining convergence of adaptive components. The data rates can switch between, for example, 10 G, 1 G, 100M and the like. The adaptive components can include, for example, equalizers, cross-talk canceller filters (e.g., NEXT filters; FEXT filters), transmission drivers, low density parity checks, echo cancellers, and other components associated with reduction of noise or interference.

In one embodiment, an ethernet transceiver integrated circuit chip is disclosed including a plurality of transceivers for coupling to a corresponding plurality of physical channels. A channel switcher is coupled to the plurality of transceivers. During a first mode of operation, the channel switcher activates all of the plurality of transceivers to transceive data in accordance with a first aggregate data transfer rate. During a second mode of operation, the channel switcher activates less than all of the plurality of transceivers to transceive data in accordance with a second aggregate data rate that is less than the first aggregate data transfer rate.

Advantageously, the communication system can save power by switching to a lower data rate. Furthermore, the original data rate can be restored without having to reestablish the connection.

BRIEF DESCRIPTION OF DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF PREFERRED EMBODIMENTS

The present invention relates generally to data communications, and more particularly to operating at a reduced data rate for power savings in data communication systems. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
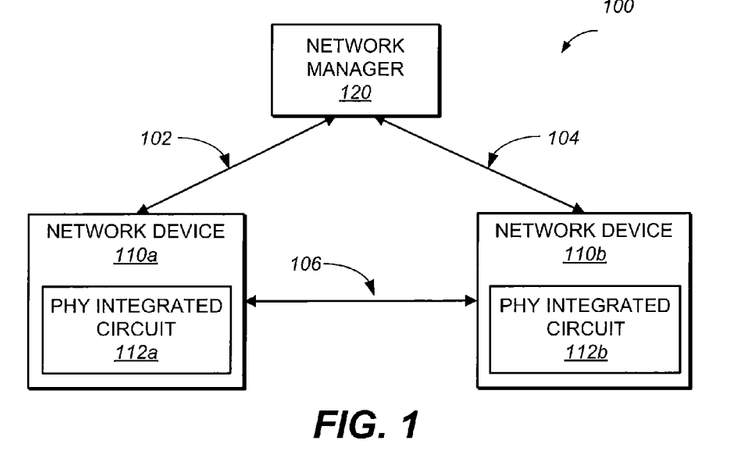
FIG. 1 is a block diagram illustrating a communications system configured to switch data rates while maintaining convergence of adaptive components, according to one embodiment of the present invention.

FIG. 1 is a block diagram illustrating a communications system 100 configured to switch data rates while maintaining convergence of adaptive components, according to one embodiment of the present invention. The communication system 100 includes network devices 110a,b and a network manager 120. The network devices 110a,b and the network manager 120 are coupled in communication for data transmission over lines 102,104,106. For example, the components can be directly or indirectly connected via the Internet, a wide area network, a telephone network, any type of connection or connectionless network, and the like. One of ordinary skill in the art will understand that the components of FIG. 1 are just one implementation of the invention, and the various alternative embodiments are within the scope and spirit of the invention. For example, there can be more than two network devices 110a,b, there can be more than one network manager 120, and the like. Additionally, in one embodiment, the functions of the network manager 120 can be decentralized by being performed with in the network devices 110a,b.

The network devices 110a,b can be, for example, computers, switches, routers, hubs, gateways, and similar devices. In other embodiments, the network devices 110a,b can be, for example, a mobile device, a cell phone, a network-ready device, or any other device capable of connecting to a network. The network devices 110a,b negotiate a first data rate, such as 10 G. Upon detecting a signal to switch data rates, the network devices 110a,b operate in a synchronized manner when switching to a second data rate, such as 1 G. During operation at 1 G, the network devices 110a,b maintain adaptive components, allowing a seamless switch back to 10 G, without the need to renegotiate or retrain. In one embodiment, a reduction in data rate results in a power savings for the network devices 110a,b.

The network devices 110a,b further comprise PHY integrated circuits 112a,b, respectively. The PHY integrated circuits 112a,b can be implemented, for example, on a line card plugged into a chassis within the network devices 112a,b, or on a mother board. In one embodiment, the PHY integrated circuits 112a,b are implemented on separate substrates. The PHY integrated circuits 112a,b can be implemented with hardware, software, and/or firmware. In one embodiment, the PHY integrated circuits 112a,b can be implemented with a programmable array or an ASIC. The PHY integrated circuits 112a,b can contain analog electronic components, digital electronic components, or a combination of both. The two PHY integrated circuits 112a,b need not be implemented in the same manner for synchronized operation. The network devices 110a,b can also comprise other computing components such as a processor, memory, and a monitor.

In operation, the PHY integrated circuits 112a,b provide a layer 1 OSI model functionality, such as sending and receiving signals between a MAC device or other layer 2 device and the line 106. In one embodiment, the PHY integrated circuits 112a,b send and receive digital signals with from the MAC device, while sending and receiving analog signals with the line 106. The PHY integrated circuits 11a,b can be integrated with the MAC device or other components, in some embodiments. The PHY integrated circuits 112a,b transmit data at varying data rates. In one embodiment, the PHY integrated circuits 112a,b are able to change data rates (e.g., drop down to a lower data rate) while maintaining a state of convergence with respect to the line 106. An implementation of the PHY integrated circuits 112a,b is described below in more detail.

The network manager 120 determines data rates of the network devices 110a,b. In one embodiment, an interface (e.g., a GUI) presented to a network administrator allows manual changes in the data rates. In another embodiment, the network manager 120 can automatically institute changes in the data rates. For example, the network manager 120 can observe bandwidth usage, and change in data rate responsive to underutilization or overutilization of the bandwidth. To change the data rate, the network manger 120 can signal the network devices 110a,b at an application layer (or another layer above layer 1) which, in turn, signals the PHY integrated circuits 112a,b. In some embodiments, the network manager 120 provides additional network administration functions.

Figure 2A:
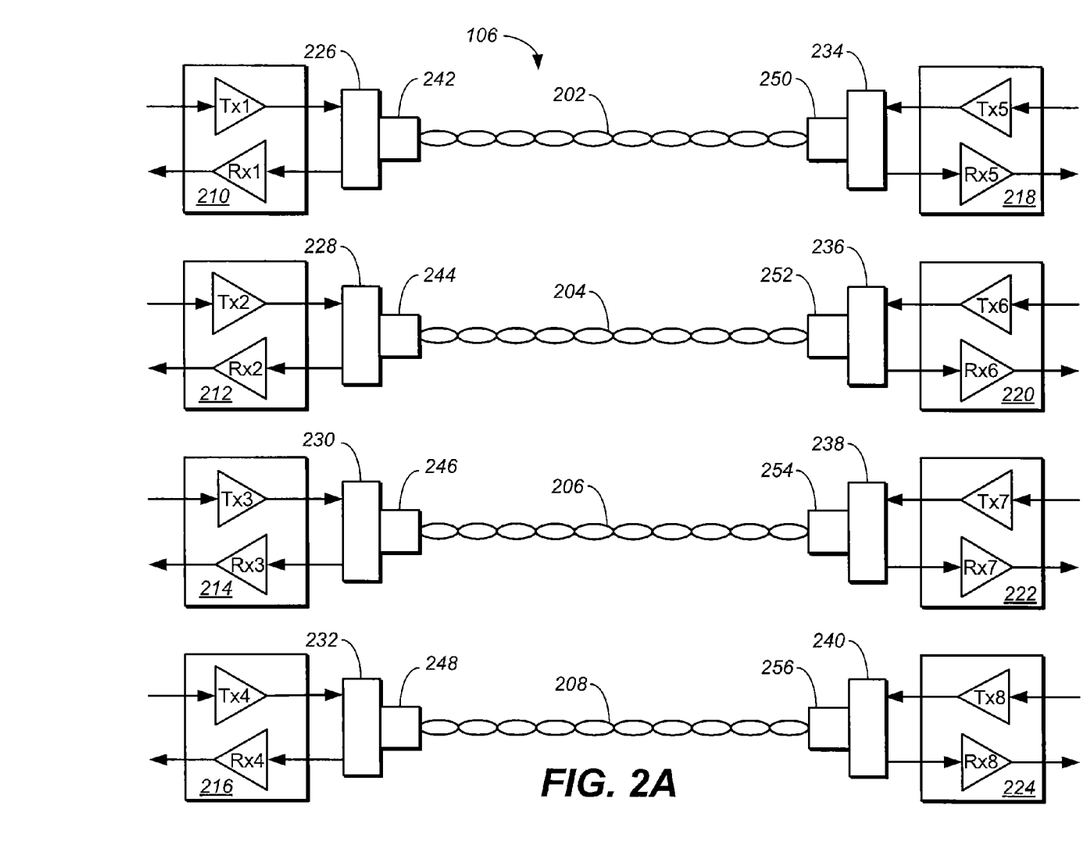
FIG. 2A is a schematic diagram illustrating further illustrating a line composed of twisted pairs of wires, according to one embodiment of the present invention.
Figure 2B:
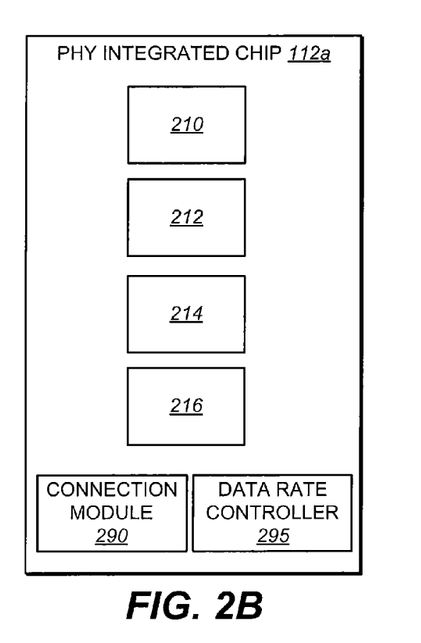
FIG. 2B is a block diagram illustrating a PHY integrated circuit, according to one embodiment of the present invention.

FIG. 2 is a schematic diagram illustrating the line 106 in further detail, according to one embodiment of the present invention. The communication line 106 includes four twisted pairs of wires 202-208 that are connected to compensation units 210-224 including transceivers through corresponding connectors 242-256. The twisted pairs 202-208 can be composed of copper, optical fiber, or any other suitable transmission medium. In one implementation, the transceivers are IEEE 10GBASE-T compliant. When operating at 10 G, each of the twisted pairs 202-208 operates at approximately 2.56 G, demanding lots of power from the transceivers and supporting circuitry. The power is wasted when the large 10 G bandwidth is underutilized. In one implementation, hybrid circuits 226-240 are used at the ends of each twisted pair of wires 202-208 to control access to a corresponding communication channel for full duplex bidirectional operation.

A connection module 290 establishes communications with other devices in layer 1 communication with each other. In one embodiment, 3 steps are followed in establishing communication: 1) auto negotiation, 2) training sequence, and 3) connection. During auto negotiation, both network devices agree as to the rate of data transmission. Many conditions which are implementations-specific can be asserted, such as current line conditions. The training sequence converges the equalizers prior to sending actual data. Once a steady state is reached, the connection is cleared for communications of actual data, although the adaptive components continue to be dynamically tweaked. If a connection is broken, due to, for example, a link failure, a power down, a reboot, an exception, or the like, the connection module 290 can reestablish the connection by repeating the auto negotiation, the training sequence, and clearing the connection.

The data rate controller 295 allows the communication rate to drop down to lower speeds for power savings. To do so, the data rate controller 295 uses an existing structure for 10GBASE-T. Rather than using, for example, all four twisted pairs with full duplex (or bidirectional) communications, the data rate controller can rotate usage of one of the twisted pairs with simplex (or unidirectional) communications. As a result, the adaptive components remain converged. The adaptive components, in one embodiment, include equalizers (e.g., FE and THP), echo cancellers, cross talk cancellers (e.g., NEXT filters, and FEXT filters), timing recovery, and frame synchronization. In one embodiment, when the data rate is subsequently increased, the connection module 290 does not need to reestablish a connection at the new rate.

Figure 3:
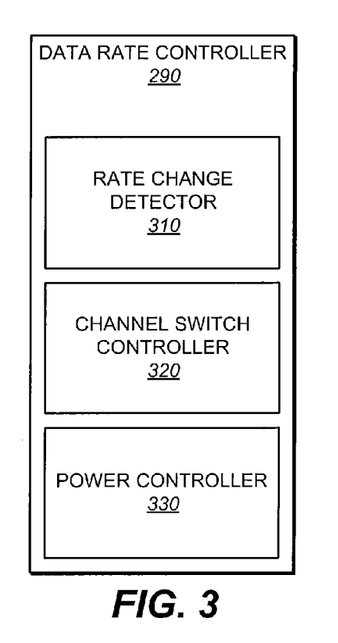
FIG. 3 is a block diagram illustrating a data rate controller, according to one embodiment of the present invention.

FIG. 3 is a block diagram illustrating a data rate controller 295, according to one embodiment of the present invention. The data rate controller 295 comprises a rate change detector 310, a channel switcher 320, and a power controller 330. The data rate controller 295 and related components can be implemented using hardware, software, and/or firmware.

The rate change detector 310 is coupled to receive a signal. The signal is a request to change a current data rate. In one embodiment, the signal can be sent from the network manager 120 of FIG. 1, in response to certain conditions as discussed above. In response, the rate change detector 310 signals other components of the rate change. The rate be reduced from a first rate to a second rate. Later, the rate can be increased from the second rate back to the first rate. Examples of the data rate used 1 G, 100M, and 10M. In one embodiment, additional inputs can be used as conditions for determining when and what type of rate change is to occur.

The channel switcher 320 keeps the filters converged with a timed use rotation across the pairs. In one embodiment, the channel switcher 320 reduces the data rate by switching from duplex communication on four twisted pairs to simplex communication on one twisted pair for transmitting signals, and simplex communication on another twisted pair for receiving signals. Each twisted pair that is kept active can remain active at the same data rate so that the reduction in data rate is achieved by reducing the number of channels rather than changing the bandwidth on a particular channel. The frames at each data rate can be the same format. At the second data rate, the frames can be zero-stuffed.

At 10 G, the bandwidth can be 800 Mhz, or 1.25 nanoseconds per symbol. In 1 G operation, only a fraction of the transmission levels and transmission frame are used, resulting in a substantial power savings. For instance, running only 2 pairs in PAM-4 simplex, versus 4 pairs in PAM-16 duplex, but at the 10 G symbol rate, creates a bidirectional 1.6 Gb/s channel which can be zero filled to achieve an net 1 G bidirectional rate. However, because the channel is simplex and the SNR required to operate is so much lower, much of the equalization and error correction machinery can be turned off, and the required transmit power reduced. However, by actively cycling through all pair combinations, it is possible to maintain the adaptive components in the 10 G channel.

In one embodiment, a round robin algorithm is used to cycle through the twisted pairs. In the alternative, there implementation-specific algorithms can be used. Due to the switching, the adaptive components remain converged. For example, the equalizers are updated and the timing phases are kept current. As a result, switching can occur to a new line without having to renegotiate communication parameters. Thus, the 2 to 5 second period of negotiation with another device is the network is avoided.

The power controller 330 powers down unused components during a lower power mode. The power controller 330 determines which components to power down based on a current state of the channel switcher 320. For example, there can be four states associated with a line with four twisted pairs. In a first state, while a first twisted pair is active to transmit, a second active pair is active to receive, and a third twisted pair and a fourth twisted pair are both inactive. In a second state, the second twisted pair is active to transmit, the third twisted pair is active to receive, and the fourth active pair and the first active pair are both inactive. The third and fourth states continue the rotation in a round robin manner. When a twisted pair is active, some components are inactive since the twisted pair is operating in simplex mode. Additionally, when a twisted pair is inactive, some components are active since the characteristics of an adjacent inactive twisted pair can affect the active twisted pair. For example, a NEXT or FEXT filter for the adjacent inactive twisted pair can remain active. Examples of particular configurations for power down are described in more detail below.

Figure 4:
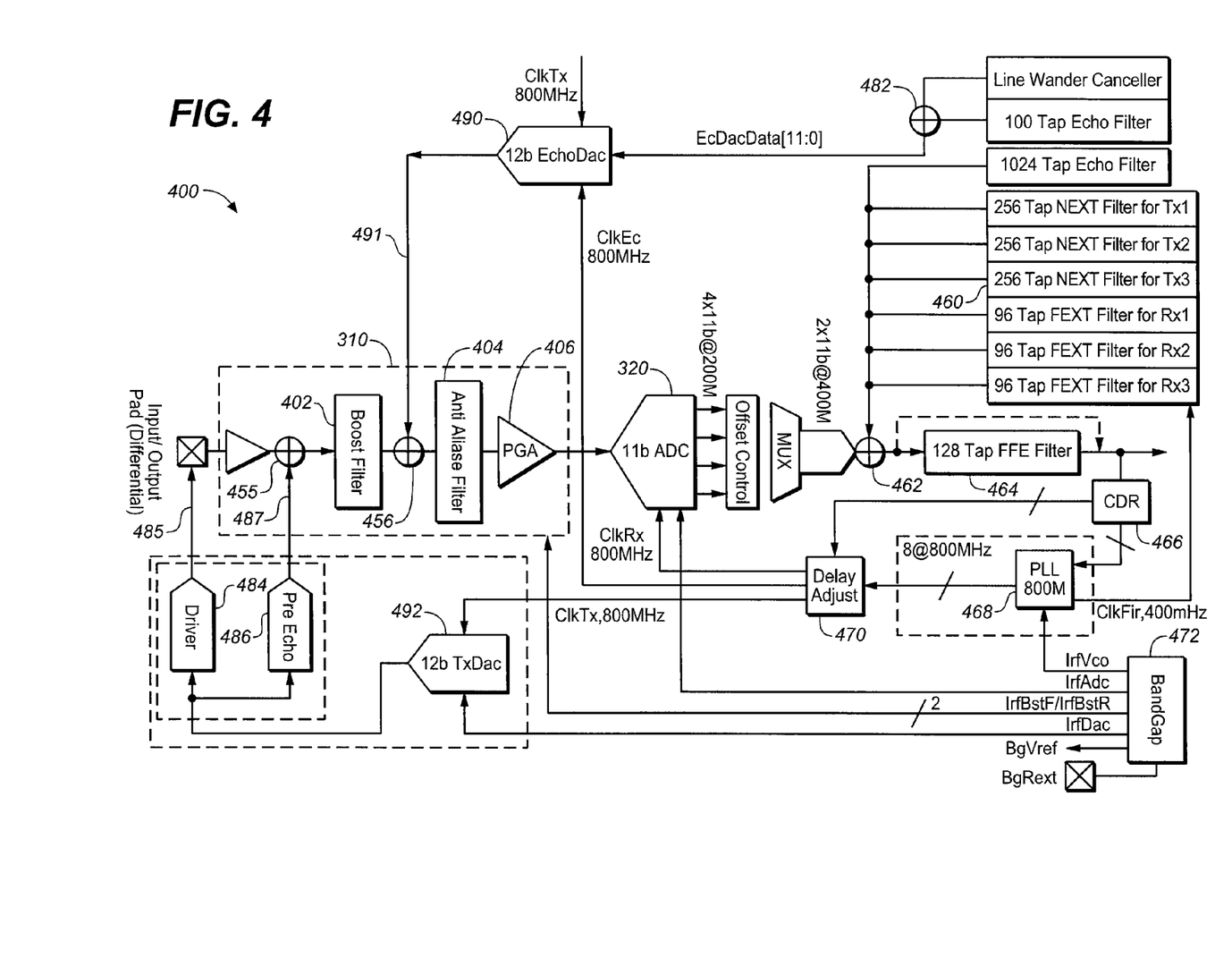
FIG. 4 is a schematic diagram illustrating an exemplary implementation of a compensation unit, according to one embodiment of the present invention.

FIG. 4 is a schematic diagram illustrating an exemplary implementation of a compensation unit 400 such as the compensation units 200-206 of FIG. 2. The compensation unit 212 includes adaptive components that remain converged while operating at low data rates. An analog compensation unit 310 comprises subtractors 455, 456, boost filter 402, an anti-alias filter 404, and a programmable gain amplifier (PGA) 406, each coupled in communication.

The booster filter 402 applies a high-pass filter to the input signal within the frequency band. In one embodiment, the booster filter 402 is configured to compensate or amplify within the frequency band of the signal (e.g., below 400 MHz). The anti-alias filter 404 attenuates portions of the signal that are out-of-band with the current signal. The PGA 406 is configured to adjust an input signal in accordance with the dynamic range of the ADC 420. The pre-echo cancellation signal 487 is applied before any filtering at the subtractor 455 so that any pre-echo signal experiences the same filtering that the input signal experiences. Specifically, the output signal Tx1 485 being transmitted from a driver 484 is replicated at a pre-echo filter 486. Also, the analog echo cancellation signal 491 is generated by an echo filter 492 for proper filter tap adaptation.

The digital compensation unit 430 comprises a set of filters 460, subtractors 462, 482, a feed forward equalizer (FFE) 464, a clock/data recovery (CDR) 466, a phase locked loop (PLL) 468, a delay adjuster 470, and a bandgap 472. The subtractor 462 receives the sampled input signal and a digital compensation signal. The digital compensation signal reduces interference associated with the signals and is generated by the subtractor 482 which combines line wander and echo data as inputs. The FFE 464 reduces other sources of interference such as intersymbol interference (ISI). The delay adjuster 470 optimizes a sample point within the span of a symbol.

TABLE 1

Power savings from unused components and components with reduced usages when operating at a reduced data rate

| | Component | Bandwidth of 10 G | Bandwidth of 1 G |
|---|---|---|---|
| Equalizers | FFE (forward feed equalizer) | 4 | 1 |
| | THP (Thompson equalizer) | 4 | 1 |

TABLE 1-continued

Power savings from unused components and components with
reduced usages when operating at a reduced data rate

| | Component | Bandwidth of 10 G | Bandwidth of 1 G |
|---|---|---|---|
| Cross-talk Filters | NEXT (near end cross talk filter) | 12 | 4 |
| | FEXT (far end cross talk filter) | 12 | 4 |
| | EC (echo canceller) | 4 | 1 |
| | LDPC (low density parity check) | 1 at 100% | 1 at 10% |
| | Driver | 4 at 100% | 1 at 6.25% |

Table 1 details the power savings from adaptive components such as those of FIG. 4 that are not used or not used as much while operating at a reduced data rate. When all four twisted pairs are active, each has an active FFE and THP. Only one FFE and THP is required for a single active twisted pair. In one embodiment, when all four twisted pairs are active, a total of 12 NEXT and FEXT filters are active because each twisted pair provides a filter for each of the other three twisted pairs. Only one NEXT and FEXT filter is required from each inactive twisted pair for a single active twisted pair. Only one echo canceller is required for each active twisted pair. The LDPC can operate at an exponentially reduced power because less bandwidth is required, and power has an exponential relationship with bandwidth. The drivers can operate at PAM-4 (pulse amplitude modulation with 4 symbols) rather than PAM-16 with only one active twisted pair. The power savings is exponential because the voltage swing is reduced from, for example, from a range of +2 v to −2 v to a range of +0.5 v to −0.5 v, or from a range of +1 v to −1 v to a range of +0.25 v to −0.25 v.

Figure 5:
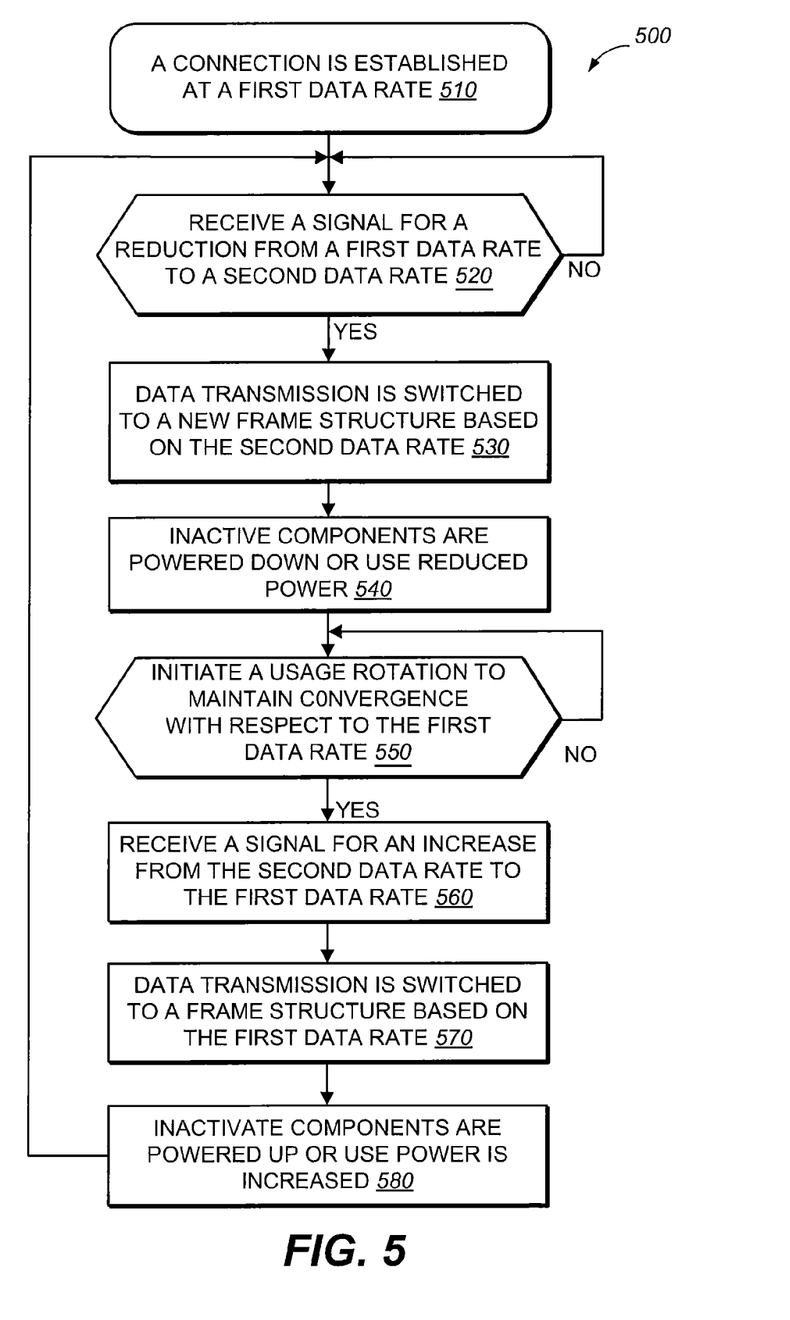
FIG. 5 is a flow chart illustrating a method for maintaining convergence of adaptive components to accommodate data rate changes, according to one embodiment of the present invention.

FIG. 5 is a flow chart illustrating a method 500 for maintaining convergence of adaptive components to accommodate data rate changes, according to one embodiment of the present invention. A connection between network devices is established 510. To do so, a data rate is negotiated, a training sequence is sent and received, and a connection is cleared. When implementation-specific conditions are reached (e.g., bandwidth underutilization) a signal requesting a reduction in a data rate (e.g., from a first data rate to a second data rate) is received 520. In one embodiment, the first data rate operates at 10 G while the second data rate operates at 100M. Data transmission is switched to a new frame structure based on the new data rate 530. Components that are inactive are powered down 540. A usage rotation is initiated to maintain convergence on the adaptive components 550. In one embodiment, a round robin usage rotation is employed.

Once conditions in bandwidth change, a signal requesting an increase in data rate (e.g., from the second data rate to the first data rate) is received 560. As a result, the data rate is increased without reestablishing a connection 570.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

What is claimed is:

1. An ethernet transceiver integrated circuit chip comprising:
   a plurality of transceivers for coupling to a corresponding plurality of physical channels; and
   a channel switcher coupled to the plurality of transceivers, wherein during a first mode of operation, the channel switcher activates all of the plurality of transceivers to transceive data in accordance with a first aggregate data transfer rate within a range of 1 Gbps and 10 Gbps, and
   wherein during a second mode of operation, the channel switcher activates less than all of the plurality of transceivers to transceive data in accordance with a second aggregate data transfer rate within the range of 1 Gbps and 10 Gbps, that is less than the first aggregate data transfer rate.

2. The ethernet transceiver integrated circuit chip according to claim 1 wherein:
   the plurality of transceivers comprises four transceivers.

3. The ethernet transceiver integrated circuit chip according to claim 1 wherein:
   a symbol rate for data transferred by each transceiver during the first mode of operation is the same as the symbol rate for data transferred by each transceiver during the second mode of operation.

4. The ethernet transceiver integrated circuit chip according to claim 1 wherein:
   a first symbol rate for data transferred by each transceiver during the first mode of operation is different than a second symbol rate for data transferred by each transceiver during the second mode of operation.

5. The ethernet transceiver integrated circuit chip according to claim 1 wherein the first mode of operation comprises a transmit mode, and the second mode of operation comprises a receive mode, and wherein:
  during the transmit mode, all of the plurality of transceivers transceive data; and
  during the receive mode, less than all of the transceivers transceive data.

6. An ethernet transceiver integrated circuit chip according to claim 1 comprising:
  wherein the channel switcher activates a set of the plurality of transceivers to operate in a bidirectional mode, and
  wherein the channel switcher activates at least one of the pluralit of transceivers not in the set to operate in a simplex mode.

7. The ethernet transceiver integrated circuit chip according to claim 6 wherein:
  the plurality of transceivers transceive data in accordance with a first syMbol rate while operating in the bidirectional mode; and
  the at least one of the plurality of transceivers operating in the simplex mode receives data in accordance with a second symbol rate.

8. The ethernet transceiver integrated circuit chip according to claim 7 wherein:
  the first symbol rate is the same as the second symbol rate.

9. The ethernet transceiver integrated circuit chip according to claim 7 wherein:
  the first symbol rate is different than the second symbol rate.

10. A method of operation in an ethernet integrated circuit chip, the method comprising:
  in a first mode, transceiving data along a group of at least four twisted pair signaling channels in accordance with a first symbol rate for each channel and at a first data rate within a range of 1 Gbps and 10 Gbps; and
  in a second mode, transceiving data at a second data rate within the range of 1 Gbps and 10 Gbps along a subset of the group of twisted pair signaling channels in accordance with the first symbol rate for each channel.

\* \* \* \* \*